US012063668B2

(12) United States Patent
Kumar

(10) Patent No.: US 12,063,668 B2
(45) Date of Patent: Aug. 13, 2024

(54) TECHNIQUES FOR BEAM REFINEMENT IN VEHICLE TO EVERYTHING COMMUNICATIONS SYSTEMS

(71) Applicant: QUALCOMM Incorporated, San Diego, CA (US)

(72) Inventor: Akash Kumar, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 269 days.

(21) Appl. No.: 17/480,668

(22) Filed: Sep. 21, 2021

(65) Prior Publication Data

US 2023/0088324 A1    Mar. 23, 2023

(51) Int. Cl.
*H04W 72/51* (2023.01)
*H04B 7/06* (2006.01)
*H04W 4/40* (2018.01)
*H04W 72/044* (2023.01)

(52) U.S. Cl.
CPC .......... *H04W 72/51* (2023.01); *H04B 7/0695* (2013.01); *H04W 4/40* (2018.02); *H04W 72/046* (2013.01)

(58) Field of Classification Search
CPC ..... H04W 72/51; H04W 4/40; H04W 72/046; H04W 4/026; H04W 4/46; H04W 72/40; H04W 64/006; H04W 76/14; H04B 7/0695; H04B 7/0617; H04B 7/06952; H04B 7/06958; H04B 7/06954; H04B 7/06956; H04B 7/0696; H04B 7/06962; H04B 7/06964; H04B 7/06966; H04B 7/06968; G08G 1/161; G08G 1/096791
See application file for complete search history.

(56) References Cited

U.S. PATENT DOCUMENTS

| 10,396,874 | B1* | 8/2019 | Garrett | H04W 64/006 |
| 2017/0072951 | A1* | 3/2017 | Sakaguchi | B60W 30/143 |
| 2018/0075746 | A1* | 3/2018 | Jiang | H04B 7/0617 |
| 2018/0242302 | A1* | 8/2018 | Lee | H04W 72/51 |
| 2020/0068415 | A1* | 2/2020 | Lee | H04B 7/0617 |
| 2021/0099847 | A1* | 4/2021 | Uchiyama | H04W 4/40 |
| 2021/0266715 | A1* | 8/2021 | Uchiyama | H04W 16/28 |
| 2022/0078652 | A1* | 3/2022 | Liu | H04W 24/08 |
| 2022/0379858 | A1* | 12/2022 | Goh | B60T 8/171 |
| 2022/0399917 | A1* | 12/2022 | Shin | H04B 17/318 |

* cited by examiner

*Primary Examiner* — Ian N Moore
*Assistant Examiner* — Sun Jong Kim
(74) *Attorney, Agent, or Firm* — Holland & Hart LLP

(57) ABSTRACT

Methods, systems, and devices for wireless communications are described. A user equipment (UE), such as a vehicular UE, may perform proactive beam management in a vehicle-to-everything (V2X) communications system. In some cases, road conditions may affect V2X connectivity for the V-UE. For example, if the V-UE is using a narrow beam and approaches a road with a steep gradient, the narrow beam may be unable to detect other V-UEs, which could lead to connection loss. Instead, the V-UE may proactively perform beam management or beam refinement to adjust the beam and maintain connectivity. For example, the V-UE may select a wider beam which has greater coverage, or the V-UE may update a direction of the narrow beam to maintain connection with neighboring V-UEs. The V-UE may use onboard sensor and computer vision-based techniques to detect changes to road conditions or its trajectory.

28 Claims, 12 Drawing Sheets

TECHNIQUES FOR BEAM REFINEMENT IN VEHICLE TO EVERYTHING COMMUNICATIONS SYSTEMS

FIELD OF TECHNOLOGY

The following relates to wireless communications, including techniques for beam refinement in vehicle to everything communications systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE, such as a vehicular UE, may use vehicle-to-everything (V2X) communications services for some vehicular services, such as autonomous driving or driver assistance systems. The UE may establish V2X (e.g., sidelink) connections with other UEs to perform the services. Techniques for maintaining a V2X connection to provide these and similar services may be deficient.

SUMMARY

The described techniques relate to improved methods, systems, devices, and apparatuses that support techniques for beam refinement in vehicle to everything communications systems. Generally, the described techniques provide for proactive beam refinement procedures at a user equipment (UE), such as a vehicular UE (V-UE), in a vehicle-to-everything (V2X) communications system. A V-UE may use V2X communications to support applications such as driving assistance or autonomous driving. In some cases, road conditions may affect V2X connectivity for the V-UE. For example, if the V-UE is using a narrow beam and approaches a road with a steep gradient, the narrow beam may be unable to detect other V-UEs, which could lead to connection loss and interruption of the driving applications. Instead, the V-UE may proactively perform beam management or beam refinement to adjust the beam and maintain connectivity. For example, the V-UE may select a wider beam which has greater coverage, or the V-UE may update a direction of the narrow beam to maintain connection with neighboring V-UEs. The V-UE may use onboard sensor and computer vision-based techniques to detect changes to road conditions or its trajectory.

A method for wireless communications at a UE is described. The method may include communicating, at the UE, using a first beam configured for a sidelink communications link, detecting a change to a trajectory of the UE, determining a beam adjustment parameter for the sidelink communications link based on the detected change to the trajectory of the UE, and communicating using a second beam applying the beam adjustment parameter based on the detected change to the trajectory of the UE.

An apparatus for wireless communications at a UE is described. The apparatus may include a processor, memory coupled with the processor, and instructions stored in the memory. The instructions may be executable by the processor to cause the apparatus to communicate, at the UE, using a first beam configured for a sidelink communications link, detect a change to a trajectory of the UE, determine a beam adjustment parameter for the sidelink communications link based on the detected change to the trajectory of the UE, and communicate using a second beam applying the beam adjustment parameter based on the detected change to the trajectory of the UE.

Another apparatus for wireless communications at a UE is described. The apparatus may include means for communicating, at the UE, using a first beam configured for a sidelink communications link, means for detecting a change to a trajectory of the UE, means for determining a beam adjustment parameter for the sidelink communications link based on the detected change to the trajectory of the UE, and means for communicating using a second beam applying the beam adjustment parameter based on the detected change to the trajectory of the UE.

A non-transitory computer-readable medium storing code for wireless communications at a UE is described. The code may include instructions executable by a processor to communicate, at the UE, using a first beam configured for a sidelink communications link, detect a change to a trajectory of the UE, determine a beam adjustment parameter for the sidelink communications link based on the detected change to the trajectory of the UE, and communicate using a second beam applying the beam adjustment parameter based on the detected change to the trajectory of the UE.

In some examples of the method, apparatuses, and non-transitory computer-readable medium described herein, detecting the change to the trajectory of the UE may include operations, features, means, or instructions for detecting the change to the trajectory of the UE based on a sensor of the UE or a computer vision application at the UE, or both.

In some examples of the method, apparatuses, and non-transitory computer-readable medium described herein, detecting the change to the trajectory of the UE may include operations, features, means, or instructions for receiving signaling indicating the change to the trajectory of the UE from another UE, a roadside unit, a server, a base station, or any combination thereof.

In some examples of the method, apparatuses, and non-transitory computer-readable medium described herein, determining the beam adjustment parameter may include operations, features, means, or instructions for determining a second beam width for the second beam based on the change to the trajectory of the UE, where the second beam width may be wider than a first beam width for the first beam.

In some examples of the method, apparatuses, and non-transitory computer-readable medium described herein, determining the beam adjustment parameter may include operations, features, means, or instructions for determining a second beam direction for the second beam based on the change to the trajectory of the UE, where the second beam direction may be different from a first beam direction for the first beam.

In some examples of the method, apparatuses, and non-transitory computer-readable medium described herein, communicating using the second beam may include operations, features, means, or instructions for deactivating the first beam based on the change to the trajectory of the UE and activating the second beam based on determining the beam adjustment parameter.

In some examples of the method, apparatuses, and non-transitory computer-readable medium described herein, determining the beam adjustment parameter may include operations, features, means, or instructions for detecting the change to a gradient of a road, a banking angle of the road, a turning radius of the road, or a direction of the UE, or any combination thereof.

In some examples of the method, apparatuses, and non-transitory computer-readable medium described herein, determining the beam adjustment parameter may include operations, features, means, or instructions for determining the beam adjustment parameter prior to the change to the trajectory of the UE, where the second beam may be used to communicate during the change to the trajectory of the UE.

Some examples of the method, apparatuses, and non-transitory computer-readable medium described herein may further include operations, features, means, or instructions for receiving signaling indicating the beam adjustment parameter from another UE, a roadside unit, a server, a base station, or any combination thereof.

Some examples of the method, apparatuses, and non-transitory computer-readable medium described herein may further include operations, features, means, or instructions for transmitting signaling indicating the change to the trajectory of the UE, the beam adjustment parameter, a location tag associated with the beam adjustment parameter, or any combination thereof, to another UE, a roadside unit, a server, a base station, or any combination thereof.

In some examples of the method, apparatuses, and non-transitory computer-readable medium described herein, communicating using the second beam may include operations, features, means, or instructions for maintaining a sidelink connection with another UE during the change to the trajectory of the UE.

In some examples of the method, apparatuses, and non-transitory computer-readable medium described herein, the sidelink communications link include V2X communications.

DETAILED DESCRIPTION

Figure 1:
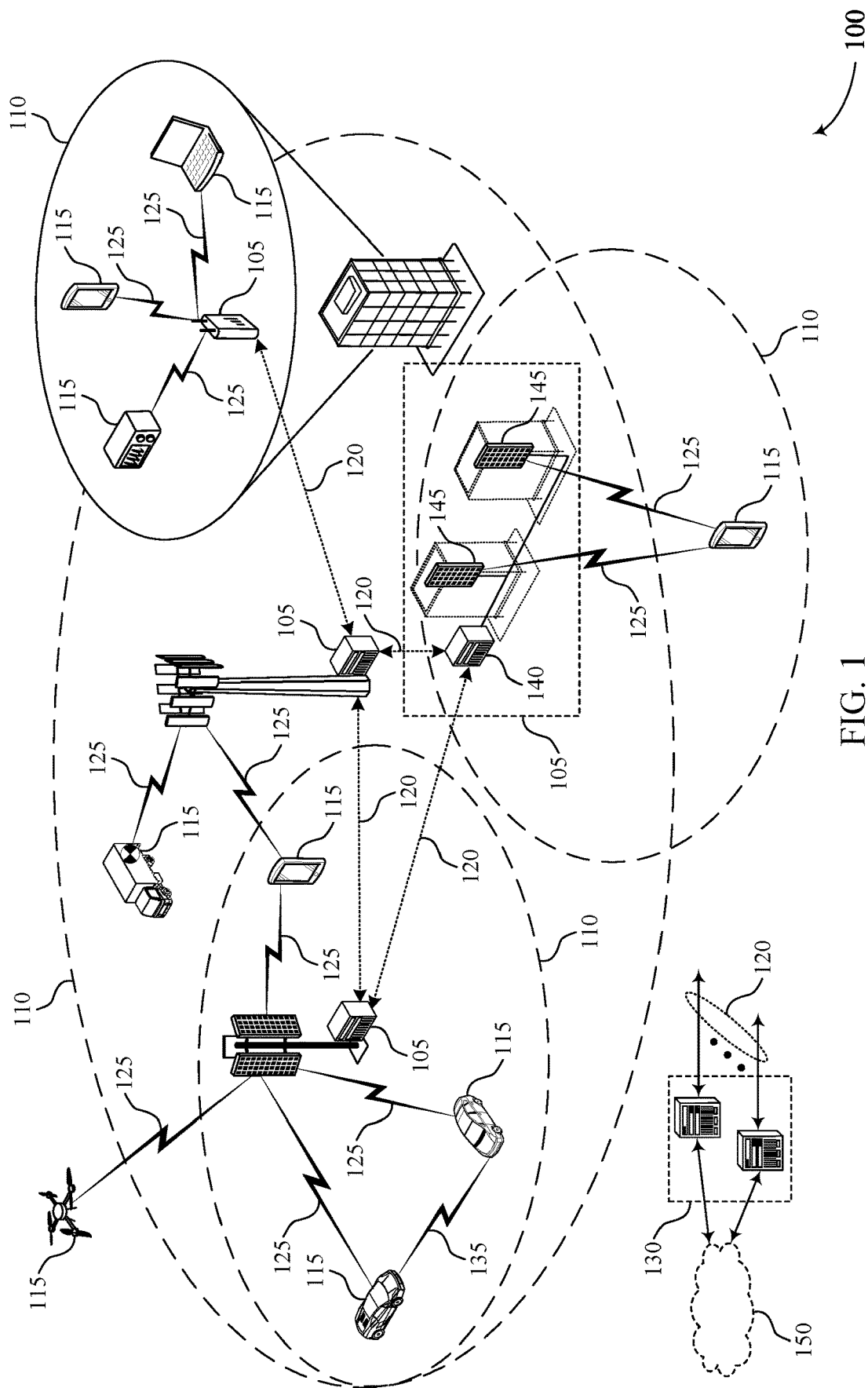
FIG. 1 illustrates an example of a wireless communications system that supports techniques for beam refinement in vehicle to everything communications systems in accordance with aspects of the present disclosure.

Some wireless communications systems may support vehicle-to-everything (V2X) communications, such as cellular V2X (C-V2X) communications. V2X communications may refer to communications between a user equipment (UE), such as a vehicular UE (V-UE), and other external entities, such as a second V-UE. For example, a V2X communications may include or support vehicle-to-vehicle (V2V) communications, vehicle-to-infrastructure (V2I), vehicle-to-pedestrian (V2P) communications or vehicle-to-cloud (V2C) communications, or other signals transmitted over-the-air from one vehicular UE to one or more other devices.

In some wireless communication systems, a UE may use C-V2X communications to enable autonomous driving, driving assistance, and advanced driver assistance systems (ADAS). In some cases, a UE may detect a drop in one or more signal strength or quality metrics and reactively perform beam management refinement techniques to restore the signal strength or quality metrics and regain full coverage. However, performing beam management and refinement after a drop in signal strength or signal quality may result in delays and momentary loss of service. For example, if a first V-UE approaches a sharp curve utilizing a narrow beam, the first V-UE may not be capable of detecting a second V-UE located around the curve due to the turning gradient. Thus, the first V-UE may detect a drop in signal quality and reactively perform a beam management procedure in order to detect the second V-UE. However, connectivity may momentarily be lost while reactively performing the beam management procedure, resulting in a delayed response and potential safety impacts, such as if the first V-UE is unable to use driving assistance without connectivity.

Techniques described herein provide for a UE (e.g., a first V-UE) to proactively perform beam management and refinement based to avoid degradation in signal strength or quality metrics, maintaining V2X connectivity. For example, a UE may utilize onboard sensors or computer vision-based algorithms to determine environmental conditions, such as a road gradient, banking angle, trajectory, or any combination thereof. When the UE detects conditions that may degrade signal strength or quality metrics for a beam, the UE may proactively perform beam refinement, avoiding degradation to radio conditions. These techniques may ensure that the beam is directed toward and can reach other UEs. For example, onboard sensors on a first V-UE may identify a sharp curve approaching through the use of an onboard sensor. The first V-UE may proactively perform beam management before entering the curve, thus maintaining V2X connectivity through the curve. For example, if a second V-UE is located around the curve, the first V-UE may detect the second V-UE without a drop in signal strength or quality metrics.

In some examples, a UE may locally store information related to environmental conditions, and the UE may use the locally stored information for proactive beam refinement (e.g. frequently traveled routes). For example, a V-UE may travel a route which it has previously traveled and use locally stored information to determine that a sharp curve is approaching. Therefore, a V-UE may proactively perform beam refinement before entering the curve to ensure V2X connectivity is maintained through the duration of the travel period. Further, a UE may transmit location-based beam management and refinement information to a second wireless device, which the second may use for proactive beam management and refinement. For example, a first V-UE may transmit beam management information to a second V-UE to support platooning and cooperative driving. Additionally, or alternatively, the first V-UE may transmit the beam management information to a server, and the server may transmit the beam management or road condition information to other UEs. Performing proactive beam refinement ensures that V2X connectivity is consistently maintained, and connectivity loss or signal quality degradation is prevented.

Aspects of the disclosure are initially described in the context of wireless communications systems. Aspects of the disclosure are further illustrated by and described with reference to apparatus diagrams, system diagrams, and flowcharts that relate to techniques for beam refinement in vehicle to everything communications systems.

FIG. 1 illustrates an example of a wireless communications system 100 that supports techniques for beam refinement in vehicle to everything communications systems in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using V2X communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115, such as a V-UE 115, may use V2X communications to support applications such as driving assistance or autonomous driving. In some cases, road conditions may affect V2X connectivity for the V-UE 115. For example, if the V-UE 115 is using a narrow beam and approaches a road with a steep gradient, the narrow beam may be unable to detect other V-UEs 115, which could lead to connection loss and interruption of the driving applications. Instead, the V-UE 115 may proactively perform beam management or beam refinement to adjust the beam and maintain connectivity. For example, the V-UE 115 may select a wider beam which has greater coverage, or the V-UE 115 may update a direction of the narrow beam to maintain connection with neighboring V-UEs 115. The V-UE 115 may use onboard sensor and computer vision-based techniques to detect changes to road conditions or its trajectory.

Figure 2:
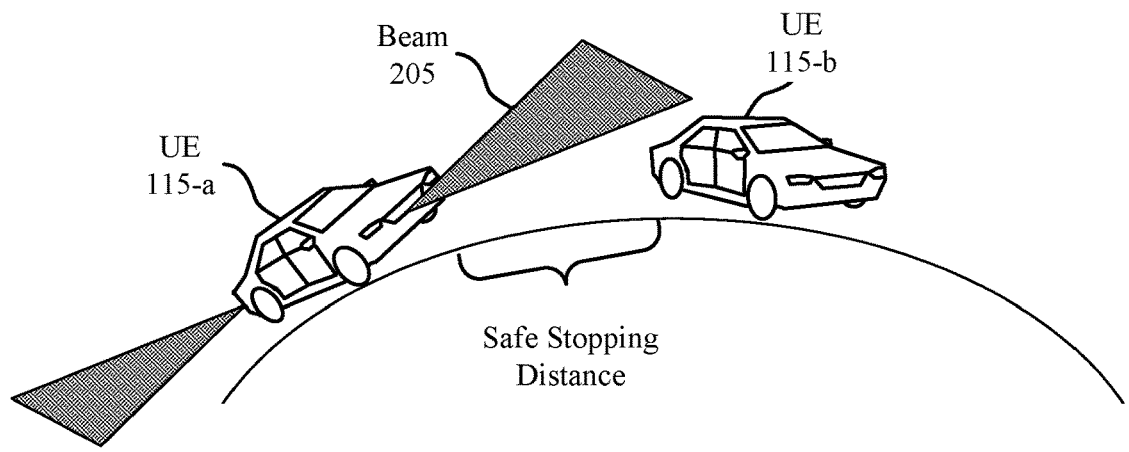
FIG. 2 illustrates an example of a wireless communications system that supports techniques for beam refinement in vehicle to everything communications systems in accordance with aspects of the present disclosure.
Figure 2:
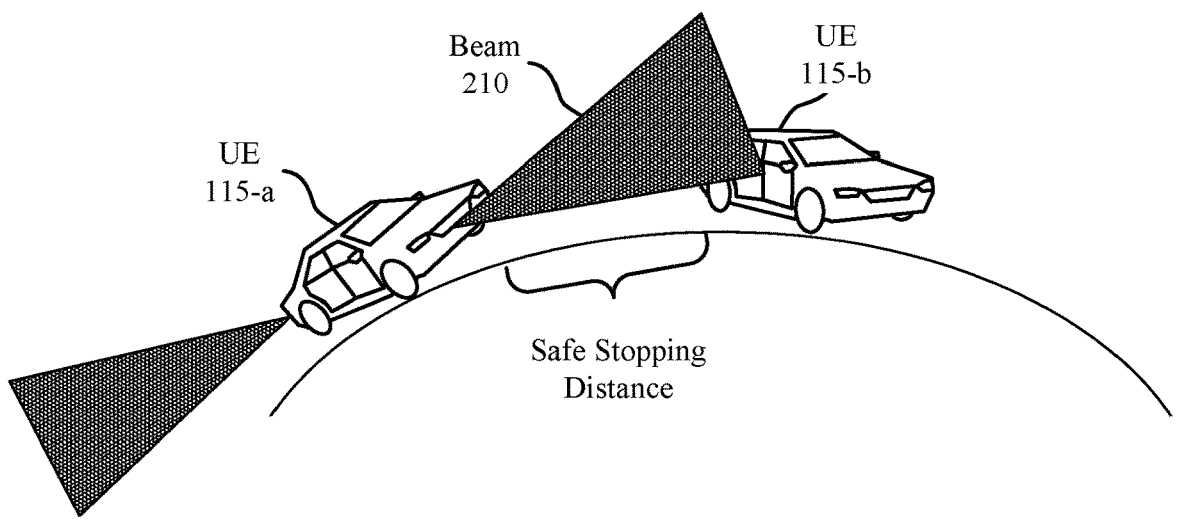

FIG. 2 illustrates an example of a wireless communications system 200 that supports techniques for beam refinement in vehicle to everything communications systems in accordance with aspects of the present disclosure. In some examples, wireless communications system 200 may implement aspects of wireless communications system 100 and may include UE 115-*a* and UE 115-*b*, which may be examples of UEs 115 as described with reference to FIG. 1. In some examples, a UE 115 may perform proactive beam management to ensure continuous C-V2X communication without degradation in radio conditions.

In some cases, a wireless device may operate using V2X communications, such as C-V2X communications. C-V2X may refer to any communication link between a UE 115 and other external entities (e.g. a second UE). For example, C-V2X may include aspects of or support one or more of V2V communications, V2I communications, V2P communications, V2C communications, or any combination thereof, among other types of signaling transmitted over-the-air from one vehicular UE to one or more other devices. Further, a wireless device operating in C-V2X may operate in multiple networks (e.g. NR, LTE, etc.) and frequency bands (e.g. FR1 and FR2) to enable lower latency operations.

In some examples, a UE 115 may use C-V2X communications to enable autonomous driving, driving assistance, and ADAS. In such cases, a UE 115 may use beams to monitor surroundings and provide non-line-of-sight awareness and a higher level of predictability for enhanced road safety. In some cases (e.g. mobility scenarios), a UE 115 may detect a drop in one or more radio conditions (e.g. signal strength or quality metrics) of a beam (e.g. due to a change in environmental conditions). Upon detection of a drop in one or more radio conditions, the UE 115 may reactively perform beam management (e.g. steering and refinement) to restore signal strength or quality. However, performing beam management after a drop in one or more radio conditions may result in delays and momentary loss of service.

For example, a UE 115 may approach a steep road gradient using a beam 205 to enable autonomous driving, driving assistance, or ADAS. Due to the road gradient, the beam 205 may not be capable of reaching other UEs 115, and the UE 115 may detect a drop in one or more radio conditions. In some wireless systems, the UEs 115 may reactively perform beam management to restore radio conditions and regain full coverage. However, the UEs 115 may experience delays or momentary loss of service due to the reactive nature of the beam management and may be incapable of stopping prior to a safe stopping distance from other UEs 115.

To ensure continuous and robust V2X connectivity, UEs 115 described herein may proactively perform beam management prior to degradation of radio conditions. For example, UE 115-*a* may use onboard sensors and computer vision algorithms to continuously monitor environmental conditions. Environmental conditions may include road gradient, banking angle, UE trajectory, or the like. UE 115-*a* may detect a change in environmental conditions and proactively perform beam management based on the change in environmental conditions. UE 115-*a* may perform beam management prior to a degradation in radio conditions, ensuring that the beam is reachable and directed towards other UEs 115 (e.g., UE 115-*b*).

For example, UE 115-*a* may approach a steep road gradient using a beam 205. Due to the road gradient, beam 205 may not be capable of reaching UE 115-*b*. UE 115-*a* may use onboard sensors or computer vision (CV)-based algorithms to determine the change in road gradient and proactively perform beam management to select a wider beam, such as a beam 210, prior to degradation of signal strength or quality metrics. By switching to a wider beam, UE 115-*a* may maintain V2X connectivity and detect UE 115-*b* prior to entering the safe stopping distance. For example, the beam 210 may provide a wider range for UE 115-*a* to maintain V2X connectivity with UE 115-*b*.

When performing the proactive beam management techniques, UE 115-*a* may perform beam refinement or beam reselection. For example, UE 115-*a* may change one or more parameters of a current beam, or UE 115-*a* may select a different beam based on the environment conditions. In some cases, the beam 210 may be a modified version of the beam 205. For example, UE 115-*a* may adjust a beam angle or direction of a beam used for V2X communications based on the proactive beam management described herein. In some examples, UE 115-*a* may reselect to a different beam. For example, UE 115-*a* may switch from a narrow beam (e.g., the beam 205) to a wider beam (e.g., the beam 210). UE 115-*a* may select the beam 210, or adjust the beam 205, to maintain connectivity with other vehicles, such as UE 115-*b*.

In some cases, a UE 115 may locally store information pertaining to environmental conditions and associated beam management (e.g. beam level) for use in proactive beam management (e.g. frequently traveled routes). For example, UE 115-*a* may travel a route containing a specific set of environmental conditions. In some cases, UE 115-*a* may perform proactive beam management based on the environmental conditions and store a memory of the environmental conditions with location information (e.g. location tag). In some examples, UE 115-*a* may store some information pertaining to the beam management that occurred due to the environmental conditions, such as positioning information, beam selection information, environment information, or any combination thereof. At a later time, upon traveling the same route, UE 115-*a* may use the locally stored information to proactively perform beam management, in addition to or as an alternative to monitoring changes to environmental conditions.

For example, UE 115-*a* may travel a given route using the beam 205 and may use onboard sensors or CV algorithms to determine a steep gradient is approaching which may result in the degradation of radio conditions. UE 115-*a* may proactively perform beam management to switch to the beam 210 and ensure C-V2X connectivity is maintained without a degradation in radio conditions. Further, UE 115-*a* may locally store information pertaining to the road gradient and associated beam management with a location tag. If UE 115-*a* travels the same route at a later time, UE 115-*a* may use the locally stored information to determine the steep gradient is approaching and proactively change from the beam 205 to the beam 210 to ensure C-V2X connectivity is maintained.

In another embodiment, a UE 115 may exchange environment condition and associated beam management information directly with other UEs 115 or with a server. For example, UE 115-*a* may communicate environment condition information or beam management information with a centralized storage solution (e.g. for platooning or cooperative driving), such as an OEM server. For example, UE 115-*a* may travel a route requiring proactive beam management UE 115-*a* may obtain, and in some cases store, information pertaining to the environmental conditions and associated beam management with a location tag. In some cases, UE 115-*a* may transmit information related to the environmental conditions, associated beam management, a location tag, or any combination thereof, to a second UE 115 or an external server. In some examples, UE 115-*a* may transmit the information to a server (e.g. an OEM server or V2X server) or centralized storage solution. In some cases, UE 115-*a* may store a beam refinement information, such as a beam steering parameter, a beamwidth change, etc., and a location tag associated with where the beam refinement information or procedure occurred in memory. In some cases, UE 115-*a* may indicate the beam refinement information and corresponding location tag to other UEs 115 a central server.

In some cases, the server, or a TRP associated with the server, may transmit the information to one or more UE 115*s*. A UE 115 may receive the environmental conditions, associated beam management, and location tag for use in proactive beam management in addition to its own onboard sensors and CV algorithm methods. Further, a centralized storage solution may build a database of environmental conditions, associated beam management, and location information across different routes and transmit the information to a UE 115 based on route information (e.g. entered destination and current location).

Similarly, UE 115-*a* may receive environmental condition information or beam management information when approaching a location where UE 115-*a* may perform proactive beam refinement. For example, upon approaching a curve or steep road gradient, UE 115-*a* may receive beam management information or environment condition information, or both, indicating for UE 115-*a* to perform proactive beam management for the curve or steep road gradient.

Figure 3:
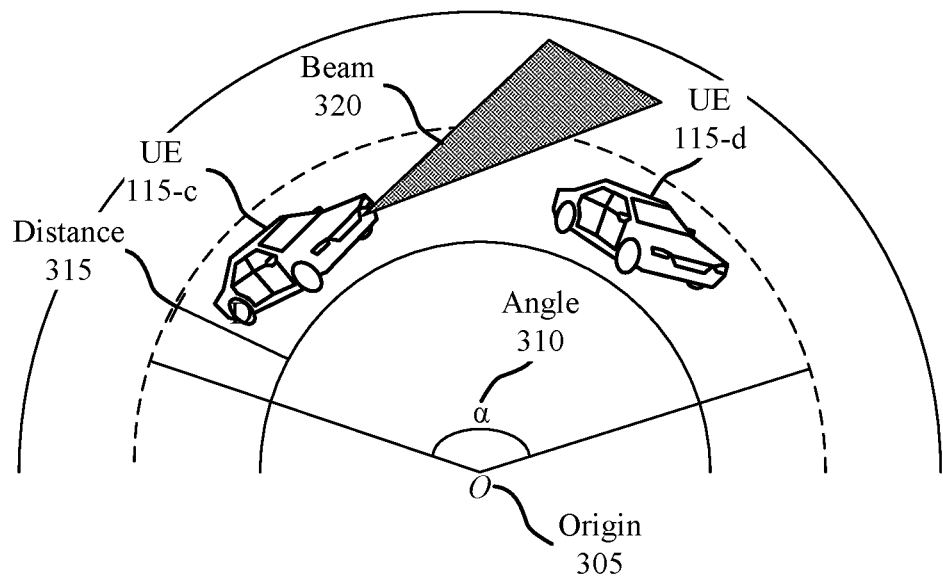
FIG. 3 illustrates an example of a wireless communications system that supports techniques for beam refinement in vehicle to everything communications systems in accordance with aspects of the present disclosure.
Figure 3:
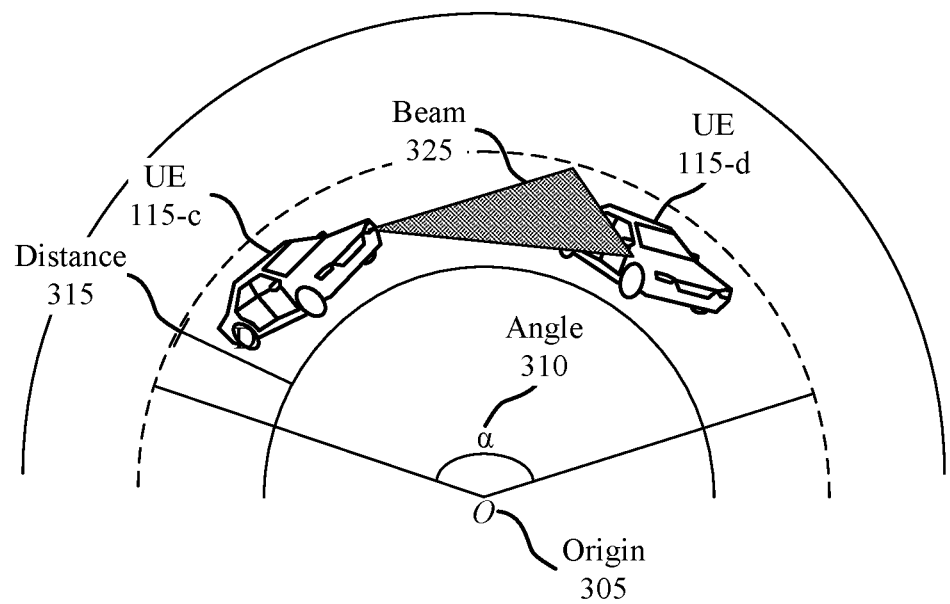

FIG. 3 illustrates an example of a wireless communications system 300 that supports techniques for beam refinement in vehicle to everything communications systems in accordance with aspects of the present disclosure. In some examples, wireless communication system 300 may implement aspects of wireless communication system 100 and wireless communications system 200. The wireless communication system 300 may include UE 115-*c* and UE 115-*d*, which may each be an example of a UE 115 as described with reference to FIGS. 1 and 2. In some examples, a UE 115 may perform proactive beam management to ensure continuous C-V2X communication without degradation in radio conditions.

Generally, a UE 115 may communicate and monitor surrounding conditions using beams while operating in a C-V2X communication system. In some cases (e.g. mobility scenarios), a UE 115 may experience a degradation in radio conditions and reactively perform beam management to restore C-V2X connectivity, resulting in delays and momentary loss of service. For example, UE 115-*c* may approach a curve, with an origin 305 and an angle 310, at a distance 315 from the inner edge of the road while using a beam 320 to monitor surrounding conditions. Upon entering the curve, UE 115-*c* would experience degradation of radio conditions due to the beam 320 being inability to detect the UE 115-*d*. For example, as UE 115-*c* or UE 115-*d*, or both, enters the curve, the beam 320 may be unable to reach UE 115-*d*.

To prevent communication delays or a momentary loss of connectivity from reactive beam management UE 115-*c* may perform proactive beam management as described with reference to FIG. 2. For example, UE 115-*c* may use onboard sensors and CV-based algorithms to continuously monitor environmental conditions and, upon detection of a change in environmental conditions, may proactively perform beam management to ensure continuous and robust C-V2X communications. For example, UE 115-*c* may approach the curve, with the origin 305 and the angle 310, at the distance 315 from the inner edge of the road while using the beam 320 to monitor surrounding conditions. UE 115-*c* may detect the change in road conditions using onboard sensors and CV algorithms and use information such as origin 305, angle 310, and distance 315 to proactively perform beam management. UE 115-*c* may perform beam refinement or reselection to select the beam 325, which may maintain connectivity with UE 115-*d* during the curve. In some cases, the beam 325 may have a different beam width or different beam angle, or both, than the beam 320. Therefore, UE 115-*c* may produce the beam 325 prior to entering the curve thus avoiding degradation in radio conditions. In some cases, upon exiting the curve, the UE 115-*c* may reselect the beam 320 to maintain connectivity with UE 115-*d* after the curve. By implementing these techniques, UE 115-*c* may prevent time periods where connectivity to UE 115-*d* is unavailable, especially during moments during a turn or curve where driving assistance applications may be utilized.

Figure 4:
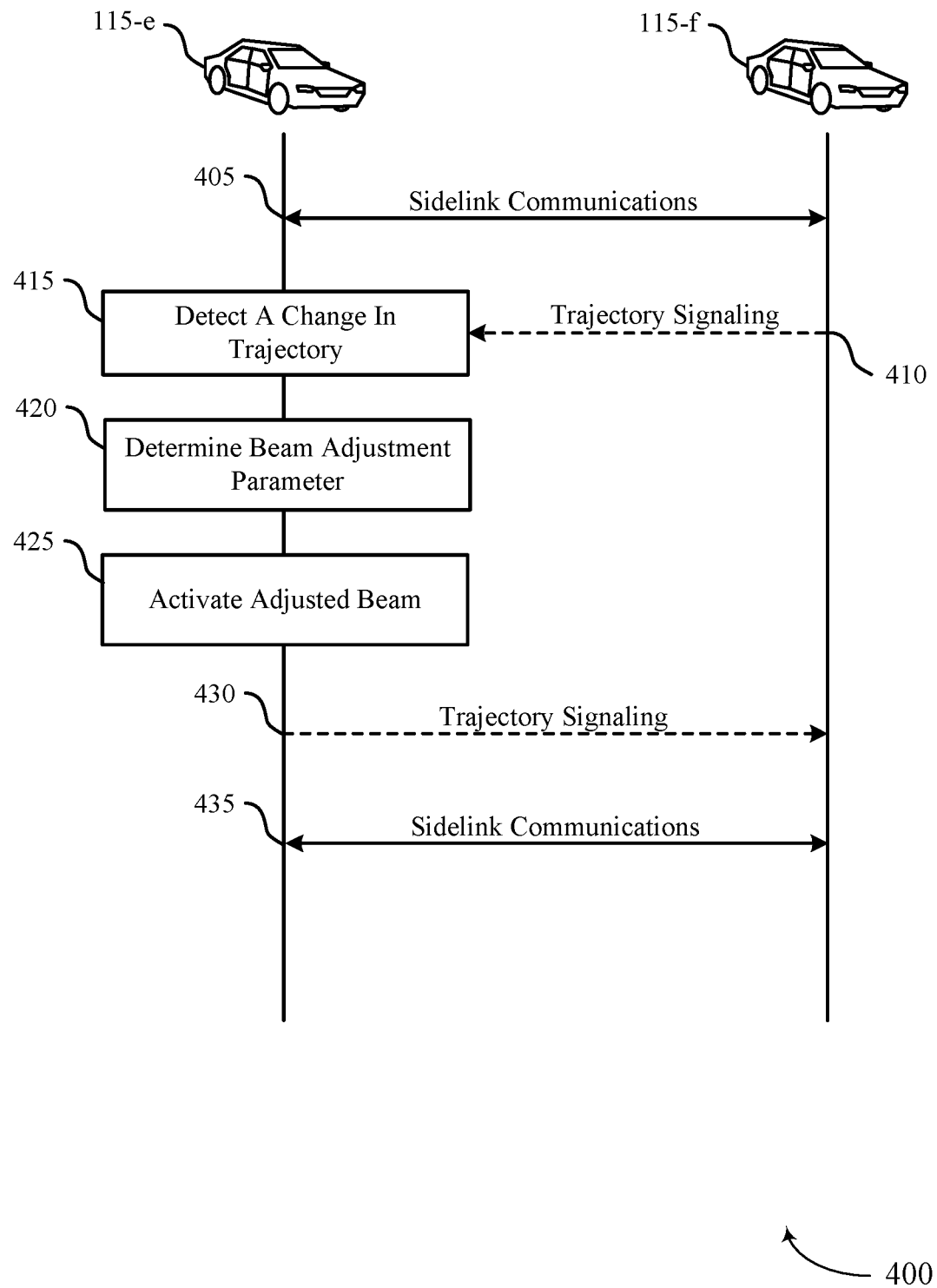
FIG. 4 illustrates an example of a process flow that supports techniques for beam refinement in vehicle to everything communications systems in accordance with aspects of the present disclosure.

FIG. 4 illustrates an example of a process flow 400 that supports techniques for beam refinement in vehicle to everything communications systems in accordance with aspects of the present disclosure. In some examples, process flow 400 may implement aspects of wireless communications system 100, wireless communications system 200, and wireless communications system 300.

The process flow 400 may be implemented by UE 115-*e* or UE 115-*f*, or both. UE 115-*e* and UE 115-*f* may each be an example of a UE 115 as described herein. For example, UE 115-*e* or UE 115-*f*, or both, may each be an example of a V-UE 115. The process flow 400 may illustrate an example of a UE 115-*e* detecting a change in trajectory and proactively performing beam adjustment. In some cases, alternative examples of the following may be implemented, where some processes are performed in a different order than described or are not performed. In some cases, processes may include additional features not mentioned below, or further processes may be added.

At 405, UE 115-*e* may communicate with UE 115-*f* using a first beam configured for sidelink communications. The sidelink communications link may include V2X communications. For example, UE 115-*e* may use C-V2X communications to transmit signaling to UE 115-*f* while traveling along a path.

In some cases, at 410, UE 115-*f* may transmit signaling indicating a change to the trajectory of UE 115-*e*. For example, UE 115-*e* and UE 115-*f* may be traveling along the same path, and UE 115-*f* may detect an approaching curve. UE 115-*f* may transmit an indication of the approaching curve to UE 115-*e*. In some cases, UE 115-*e* may receive beam management information, such as an indication of a beam refinement or beam adjustment configuration in order to maintain connectivity with UE 115-*f*. Additionally, or alternatively, a roadside unit, a server, a base station, or any combination thereof, may transmit signaling indicating a change to the trajectory of UE 115-*e*.

At 415, UE 115-*e* may detect a change to its trajectory. In some cases, UE 115-*e* may detect the change in trajectory based on a sensor of UE 115-*e* or a CV application at UE 115-*e*, or both. For example, UE 115-*e* may detect a change to a gradient of a road, a banking angle of the road, a turning radius of the road, or a direction of UE 115-*e*, or any combination thereof. Additionally, or alternatively, UE 115-*e* may detect the change in trajectory based on trajectory information received at 410 (e.g., which may be transmitted from UE 115-*f*).

At 420, UE 115-*e* may determine a beam adjustment parameter for the sidelink communications link based on the detected change to the trajectory. For example, UE 115-*e* may detect a change in road gradient and determine a beam adjustment parameter based on the change in road gradient. Further, UE 115-*e* may determine the beam adjustment parameter prior to the change to the trajectory of UE 115-*e*, where the second beam is used to communicate during the change to its trajectory.

In some cases, UE 115-*e* may determine a second beam width for the second beam based on the change to its trajectory, where the second beam width is wider than a first beam width for the first beam. Additionally, or alternatively, UE 115-*e* may determine a second beam direction for the second beam based on the change to its trajectory, where the second beam direction is different from a first beam direction for the first beam. In some cases, the trajectory signaling at 410 may include an indication of the beam adjustment parameter. For example, UE 115-*e* may receive signaling from UE 115-*f* or from another device (e.g., a server, base station, roadside unit, etc.) indicating the beam adjustment parameter. UE 115-*e* may perform beam refinement using the beam adjustment parameters received from the other device (e.g., UE 115-*f* or the server).

At 425, UE 115-*e* may switch to using the second beam based on the determined beam adjustment parameter. In some cases, UE 115-*e* may apply the beam adjustment parameter to the first beam to obtain the second beam. In some other examples, UE 115-*e* may deactivate the first beam and activate the second beam. For example, UE 115-*e* may approach a hill with a steep road gradient and determine the beam adjustment parameter based on the road gradient. UE 115-*e* may deactivate a first beam and activate a second based on the beam adjustment parameters corresponding to the road gradient. For example, the second beam may be a wider beam or a beam which is angled differently, which may enable UE 115-*e* to detect other vehicles farther along the road. For example, UE 115-*e* may maintain a sidelink connection with UE 115-*f* during the change to its trajectory (e.g., while traveling over the section of the road with a steeper gradient).

In some cases, at 430, UE 115-*e* may transmit trajectory information to UE 115-*f* indicating the change to the trajectory of UE 115-*e*. For example, UE 115-*e* may indicate the beam adjustment parameter, positioning information (e.g., a geographic positioning tag), road condition information, road condition change information, beam refinement information, or any combination thereof, to other UEs 115, which may include UE 115-*f* In some cases, UE 115-*e* may indicate the trajectory information to another device, such as a server, a base station 105, a roadside unit, or a transmission/reception point. For example, UE 115-*e* may travel a path with a sharp curve and transmit data relating to the turning radius of the road to UE 115-*f*.

At 435, UE 115-*e* may communicate with UE 115-*f* using the second beam applying the beam adjustment parameter based on the detected change to the trajectory of UE 115-*e*.

In some cases, UE 115-*e* may switch back to the first beam, such as after the road condition. For example, once UE 115-*e* completes the turn or the road levels out, UE 115-*e* may switch back to using the first beam.

Figure 5:
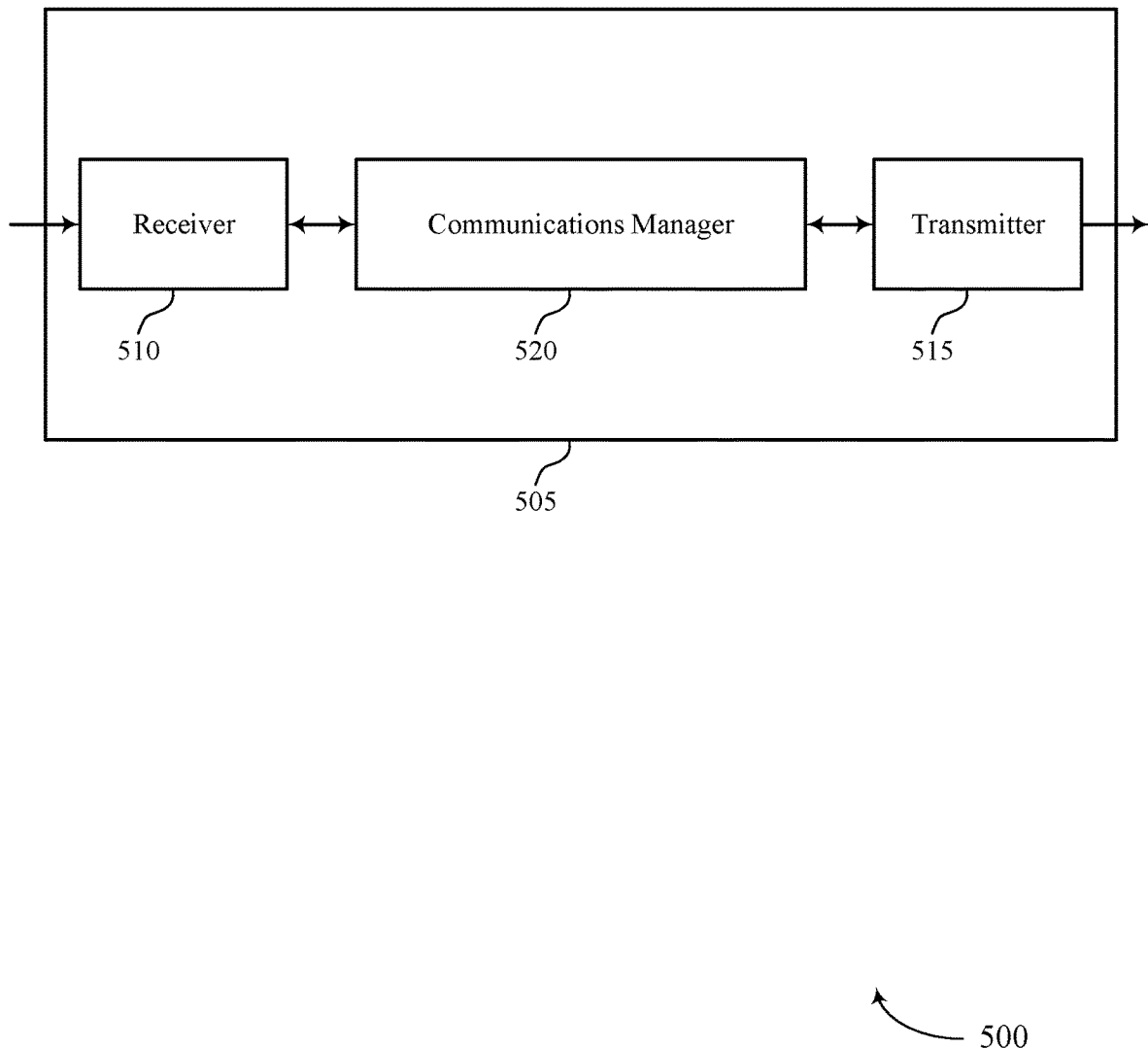
FIGS. 5 and 6 show block diagrams of devices that support techniques for beam refinement in vehicle to everything communications systems in accordance with aspects of the present disclosure.

FIG. 5 shows a block diagram 500 of a device 505 that supports techniques for beam refinement in vehicle to everything communications systems in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for beam refinement in vehicle to everything communications systems). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for beam refinement in vehicle to everything communications systems). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for beam refinement in vehicle to everything communications systems as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for communicating, at the UE, using a first beam configured for a sidelink communications link. The communications manager 520 may be configured as or otherwise support a means for detecting a change to a trajectory of the UE. The communications manager 520 may be configured as or otherwise support a means for determining a beam adjustment parameter for the sidelink communications link based on the detected change to the trajectory of the UE. The communications manager 520 may be configured as or otherwise support a means for communicating using a second beam applying the beam adjustment parameter based on the detected change to the trajectory of the UE.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for improved connection quality by maintaining a V2X communications link during conditions which may affect beam quality or connection. For example, the device 505 may proactively perform beam management prior to experiencing degraded signal quality from a change to a road condition.

Figure 6:
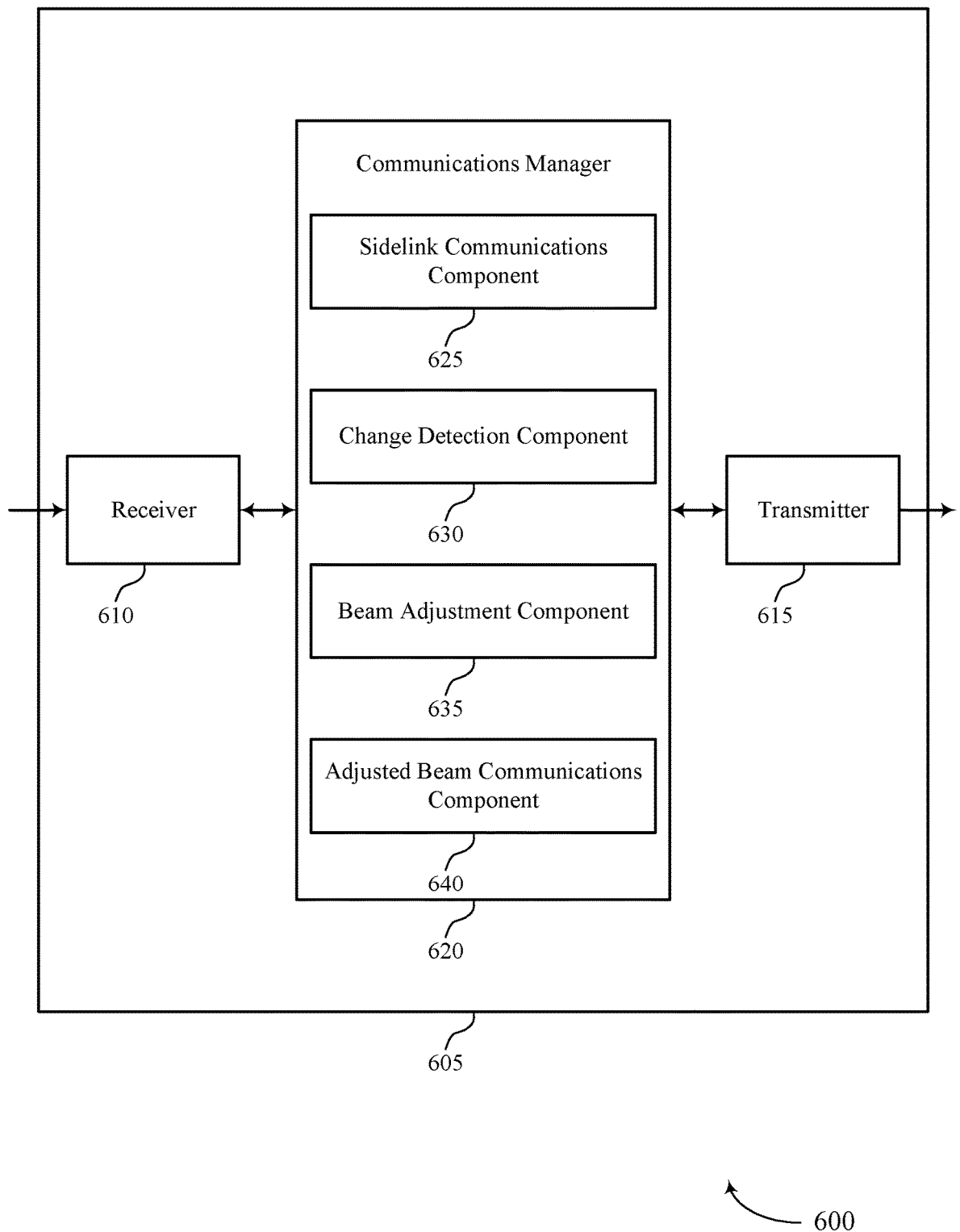

FIG. 6 shows a block diagram 600 of a device 605 that supports techniques for beam refinement in vehicle to everything communications systems in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for beam refinement in vehicle to everything communications systems). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for beam refinement in vehicle to everything communications systems). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for beam refinement in vehicle to everything communications systems as described herein. For example, the communications manager 620 may include a sidelink communications component 625, a change detection component 630, a beam adjustment component 635, an adjusted beam communications component 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The sidelink communications component 625 may be configured as or otherwise support a means for communicating, at the UE, using a first beam configured for a sidelink communications link. The change detection component 630 may be configured as or otherwise support a means for detecting a change to a trajectory of the UE. The beam adjustment component 635 may be configured as or otherwise support a means for determining a beam adjustment parameter for the sidelink communications link based on the detected change to the trajectory of the UE. The adjusted beam communications component 640 may be configured as or otherwise support a means for communicating using a second beam applying the beam adjustment parameter based on the detected change to the trajectory of the UE.

Figure 7:
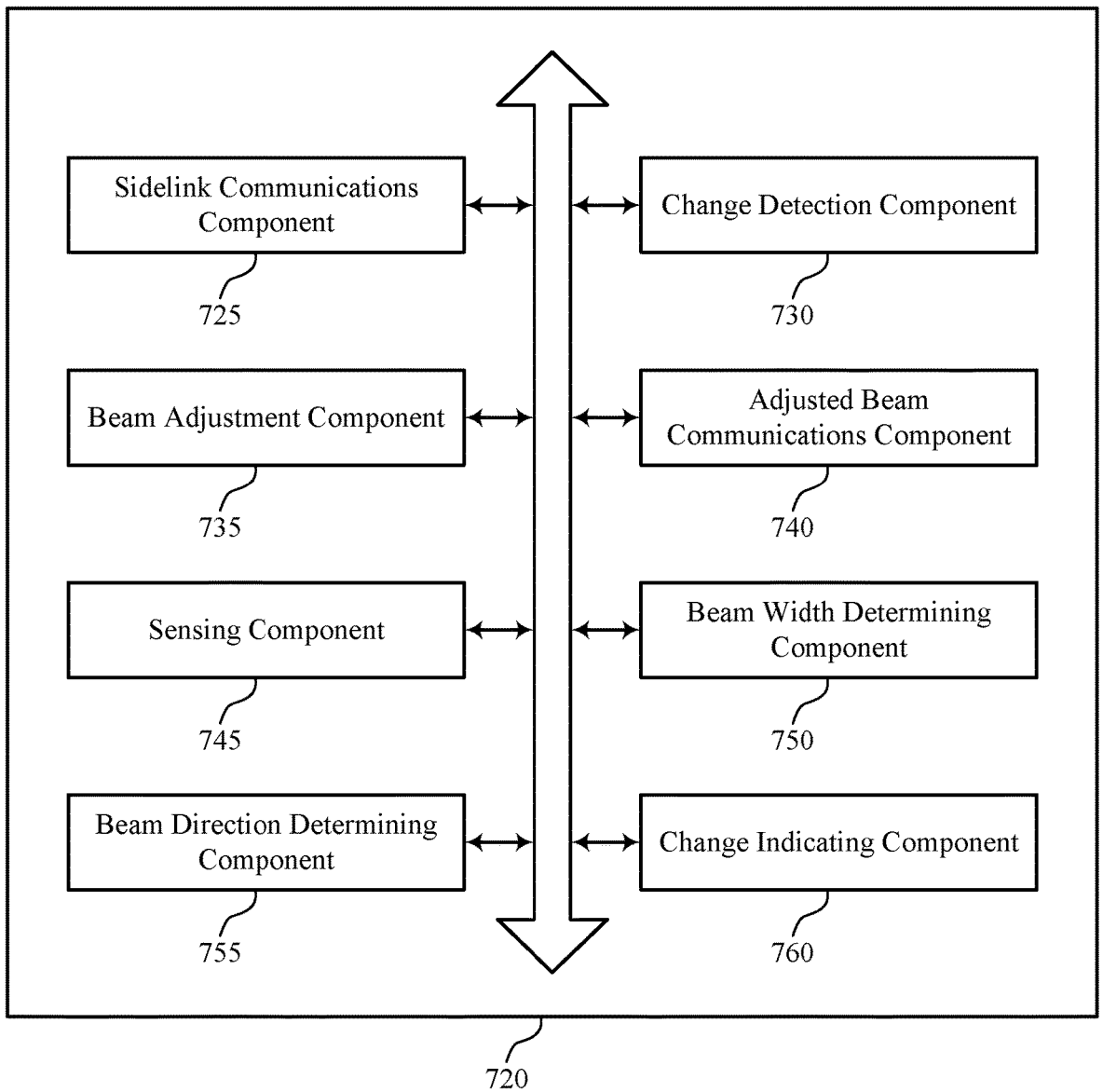
FIG. 7 shows a block diagram of a communications manager that supports techniques for beam refinement in vehicle to everything communications systems in accordance with aspects of the present disclosure.

FIG. 7 shows a block diagram 700 of a communications manager 720 that supports techniques for beam refinement in vehicle to everything communications systems in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for beam refinement in vehicle to everything communications systems as described herein. For example, the communications manager 720 may include a sidelink communications component 725, a change detection component 730, a beam adjustment component 735, an adjusted beam communications component 740, a sensing component 745, a beam width determining component 750, a beam direction determining component 755, a change indicating component 760, or any combination thereof. Each of these components may communicate, directly or indirectly, with one another (e.g., via one or more buses).

The communications manager 720 may support wireless communications at a UE in accordance with examples as disclosed herein. The sidelink communications component 725 may be configured as or otherwise support a means for communicating, at the UE, using a first beam configured for a sidelink communications link. The change detection component 730 may be configured as or otherwise support a means for detecting a change to a trajectory of the UE. The beam adjustment component 735 may be configured as or otherwise support a means for determining a beam adjustment parameter for the sidelink communications link based on the detected change to the trajectory of the UE. The adjusted beam communications component 740 may be configured as or otherwise support a means for communicating using a second beam applying the beam adjustment parameter based on the detected change to the trajectory of the UE.

In some examples, to support detecting the change to the trajectory of the UE, the sensing component 745 may be configured as or otherwise support a means for detecting the change to the trajectory of the UE based on a sensor of the UE or a computer vision application at the UE, or both.

In some examples, to support detecting the change to the trajectory of the UE, the change detection component 730 may be configured as or otherwise support a means for receiving signaling indicating the change to the trajectory of the UE from another UE, a roadside unit, a server, a base station, or any combination thereof.

In some examples, to support determining the beam adjustment parameter, the beam width determining component 750 may be configured as or otherwise support a means for determining a second beam width for the second beam based on the change to the trajectory of the UE, where the second beam width is wider than a first beam width for the first beam.

In some examples, to support determining the beam adjustment parameter, the beam direction determining component 755 may be configured as or otherwise support a means for determining a second beam direction for the second beam based on the change to the trajectory of the UE, where the second beam direction is different from a first beam direction for the first beam.

In some examples, to support communicating using the second beam, the beam adjustment component 735 may be configured as or otherwise support a means for deactivating the first beam based on the change to the trajectory of the UE. In some examples, to support communicating using the second beam, the adjusted beam communications component 740 may be configured as or otherwise support a means for activating the second beam based on determining the beam adjustment parameter.

In some examples, to support determining the beam adjustment parameter, the change detection component 730 may be configured as or otherwise support a means for detecting the change to a gradient of a road, a banking angle of the road, a turning radius of the road, or a direction of the UE, or any combination thereof.

In some examples, to support determining the beam adjustment parameter, the beam adjustment component 735 may be configured as or otherwise support a means for determining the beam adjustment parameter prior to the change to the trajectory of the UE, where the second beam is used to communicate during the change to the trajectory of the UE.

In some examples, the beam adjustment component 735 may be configured as or otherwise support a means for receiving signaling indicating the beam adjustment parameter from another UE, a roadside unit, a server, a base station, or any combination thereof.

In some examples, the change indicating component 760 may be configured as or otherwise support a means for transmitting signaling indicating the change to the trajectory of the UE, the beam adjustment parameter, a location tag associated with the beam adjustment parameter, or any combination thereof, to another UE, a roadside unit, a server, a base station, or any combination thereof.

In some examples, to support communicating using the second beam, the sidelink communications component 725 may be configured as or otherwise support a means for maintaining a sidelink connection with another UE during the change to the trajectory of the UE. In some examples, the sidelink communications link include V2X communications.

Figure 8:
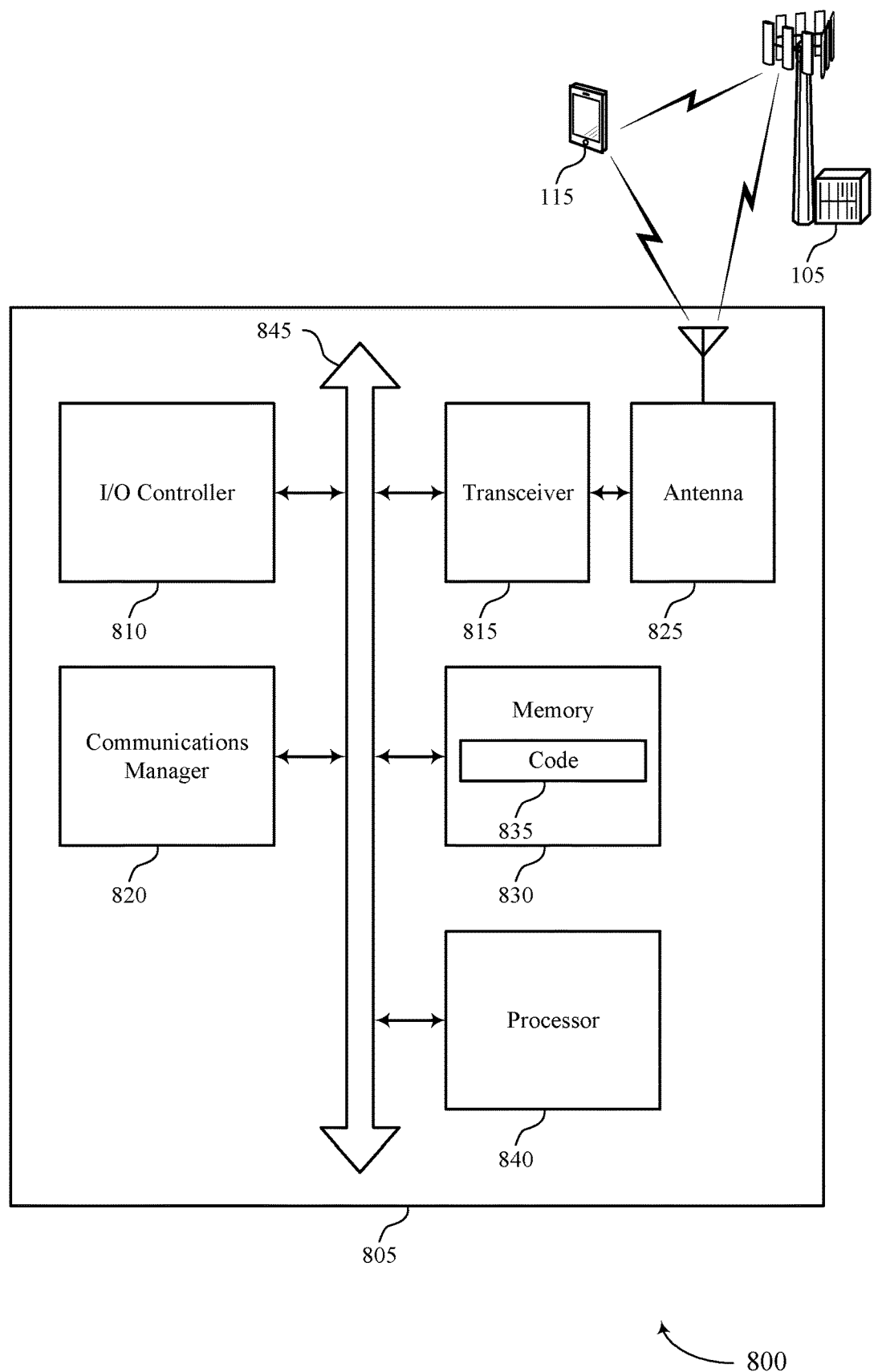
FIG. 8 shows a diagram of a system including a device that supports techniques for beam refinement in vehicle to everything communications systems in accordance with aspects of the present disclosure.

FIG. 8 shows a diagram of a system 800 including a device 805 that supports techniques for beam refinement in vehicle to everything communications systems in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for beam refinement in vehicle to everything communications systems). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for communicating, at the UE, using a first beam configured for a sidelink communications link. The communications manager 820 may be configured as or otherwise support a means for detecting a change to a trajectory of the UE. The communications manager 820 may be configured as or otherwise support a means for determining a beam adjustment parameter for the sidelink communications link based on the detected change to the trajectory of the UE. The communications manager 820 may be configured as or otherwise support a means for communicating using a second beam applying the beam adjustment parameter based on the detected change to the trajectory of the UE.

By including or configuring the communications manager 820 in accordance with examples as described herein, the device 805 may support techniques for improved communication reliability and improved coordination between devices. For example, the device 805 may proactively perform beam management prior to experiencing degraded signal quality from a change to a road condition.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for beam refinement in vehicle to everything communications systems as described herein, or the processor 840 and the memory 830 may be otherwise configured to perform or support such operations.

Figure 9:
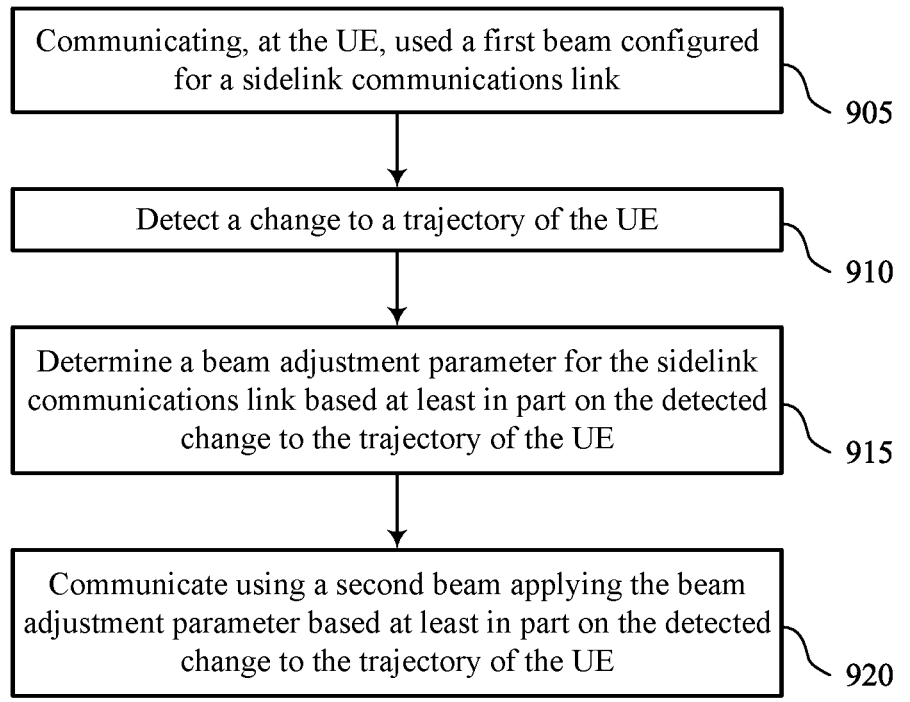
FIGS. 9 through 12 show flowcharts illustrating methods that support techniques for beam refinement in vehicle to everything communications systems in accordance with aspects of the present disclosure.

FIG. 9 shows a flowchart illustrating a method 900 that supports techniques for beam refinement in vehicle to everything communications systems in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include communicating, at the UE, using a first beam configured for a sidelink communications link. The operations of 905 may be performed in accordance with examples as disclosed herein. In some examples, aspects of the operations of 905 may be performed by a sidelink communications component 725 as described with reference to FIG. 7.

At 910, the method may include detecting a change to a trajectory of the UE. The operations of 910 may be performed in accordance with examples as disclosed herein. In some examples, aspects of the operations of 910 may be performed by a change detection component 730 as described with reference to FIG. 7.

At 915, the method may include determining a beam adjustment parameter for the sidelink communications link based on the detected change to the trajectory of the UE. The operations of 915 may be performed in accordance with examples as disclosed herein. In some examples, aspects of the operations of 915 may be performed by a beam adjustment component 735 as described with reference to FIG. 7.

At 920, the method may include communicating using a second beam applying the beam adjustment parameter based on the detected change to the trajectory of the UE. The operations of 920 may be performed in accordance with examples as disclosed herein. In some examples, aspects of the operations of 920 may be performed by an adjusted beam communications component 740 as described with reference to FIG. 7.

Figure 10:
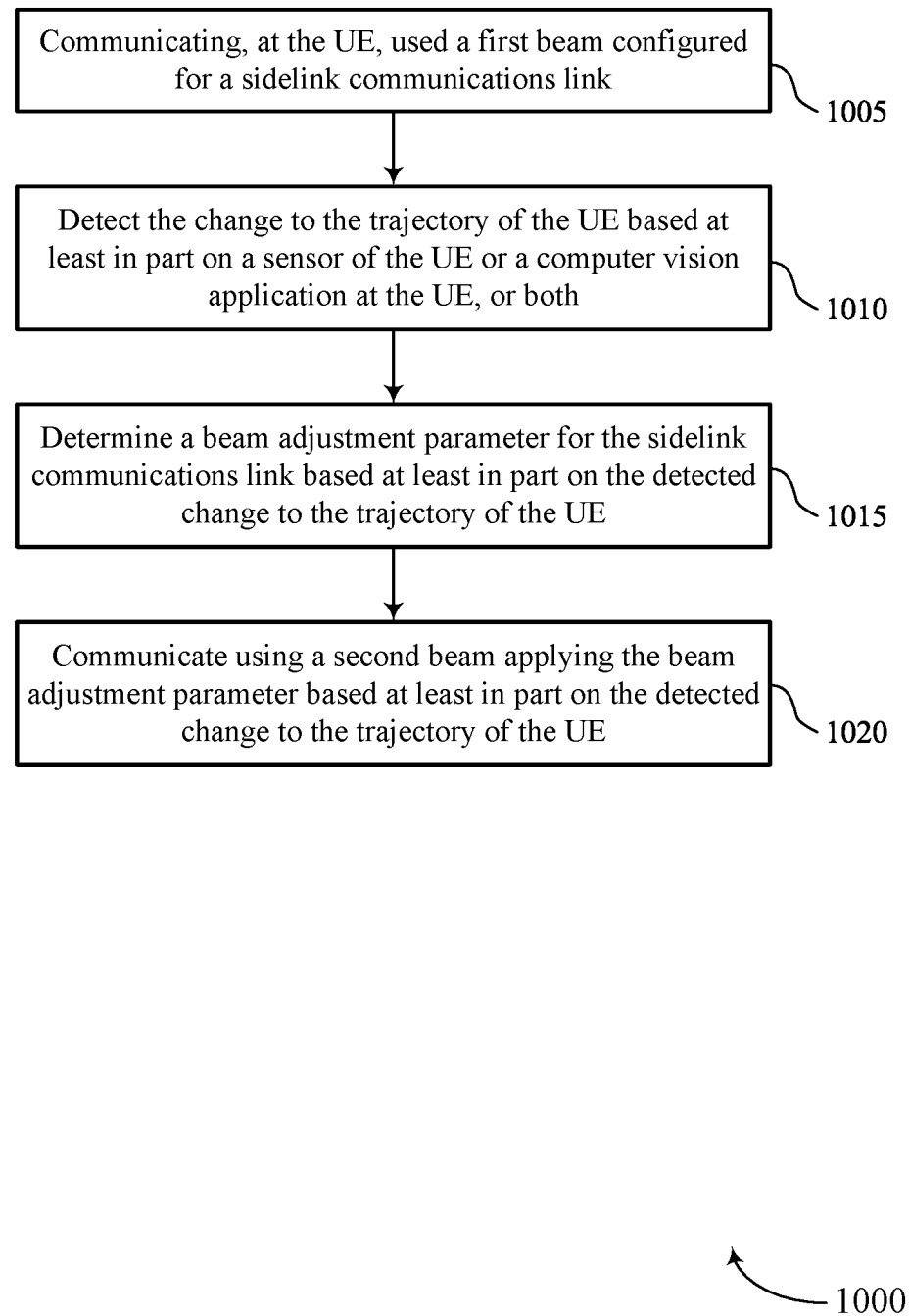

FIG. 10 shows a flowchart illustrating a method 1000 that supports techniques for beam refinement in vehicle to everything communications systems in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include communicating, at the UE, using a first beam configured for a sidelink communications link. The operations of 1005 may be performed in accordance with examples as disclosed herein. In some examples, aspects of the operations of 1005 may be performed by a sidelink communications component 725 as described with reference to FIG. 7.

At 1010, the method may include detecting a change to a trajectory of the UE based on a sensor of the UE or a computer vision application at the UE, or both. The operations of 1010 may be performed in accordance with examples as disclosed herein. In some examples, aspects of the operations of 1010 may be performed by a sensing component 745 as described with reference to FIG. 7.

At 1015, the method may include determining a beam adjustment parameter for the sidelink communications link based on the detected change to the trajectory of the UE. The operations of 1015 may be performed in accordance with examples as disclosed herein. In some examples, aspects of the operations of 1015 may be performed by a beam adjustment component 735 as described with reference to FIG. 7.

At 1020, the method may include communicating using a second beam applying the beam adjustment parameter based on the detected change to the trajectory of the UE. The operations of 1020 may be performed in accordance with examples as disclosed herein. In some examples, aspects of the operations of 1020 may be performed by an adjusted beam communications component 740 as described with reference to FIG. 7.

Figure 11:
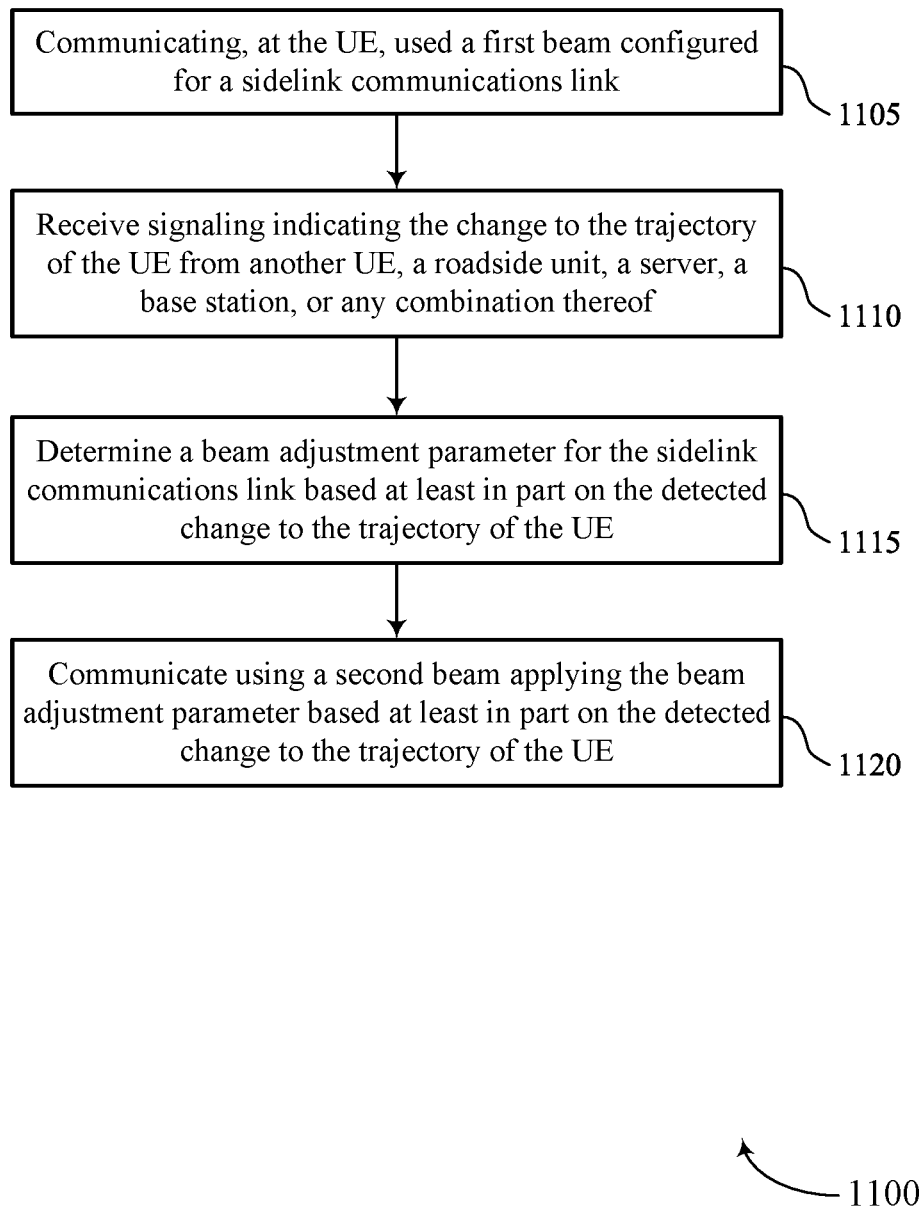

FIG. 11 shows a flowchart illustrating a method 1100 that supports techniques for beam refinement in vehicle to everything communications systems in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include communicating, at the UE, using a first beam configured for a sidelink communications link. The operations of 1105 may be performed in accordance with examples as disclosed herein. In some examples, aspects of the operations of 1105 may be performed by a sidelink communications component 725 as described with reference to FIG. 7.

At 1110, the method may include receiving signaling indicating a change to a trajectory of the UE from another UE, a roadside unit, a server, a base station, or any combination thereof. The operations of 1110 may be performed in accordance with examples as disclosed herein. In some examples, aspects of the operations of 1110 may be performed by a change detection component 730 as described with reference to FIG. 7.

At 1115, the method may include determining a beam adjustment parameter for the sidelink communications link based on the detected change to the trajectory of the UE. The operations of 1115 may be performed in accordance with examples as disclosed herein. In some examples, aspects of the operations of 1115 may be performed by a beam adjustment component 735 as described with reference to FIG. 7.

At 1120, the method may include communicating using a second beam applying the beam adjustment parameter based on the detected change to the trajectory of the UE. The operations of 1120 may be performed in accordance with examples as disclosed herein. In some examples, aspects of the operations of 1120 may be performed by an adjusted beam communications component 740 as described with reference to FIG. 7.

Figure 12:
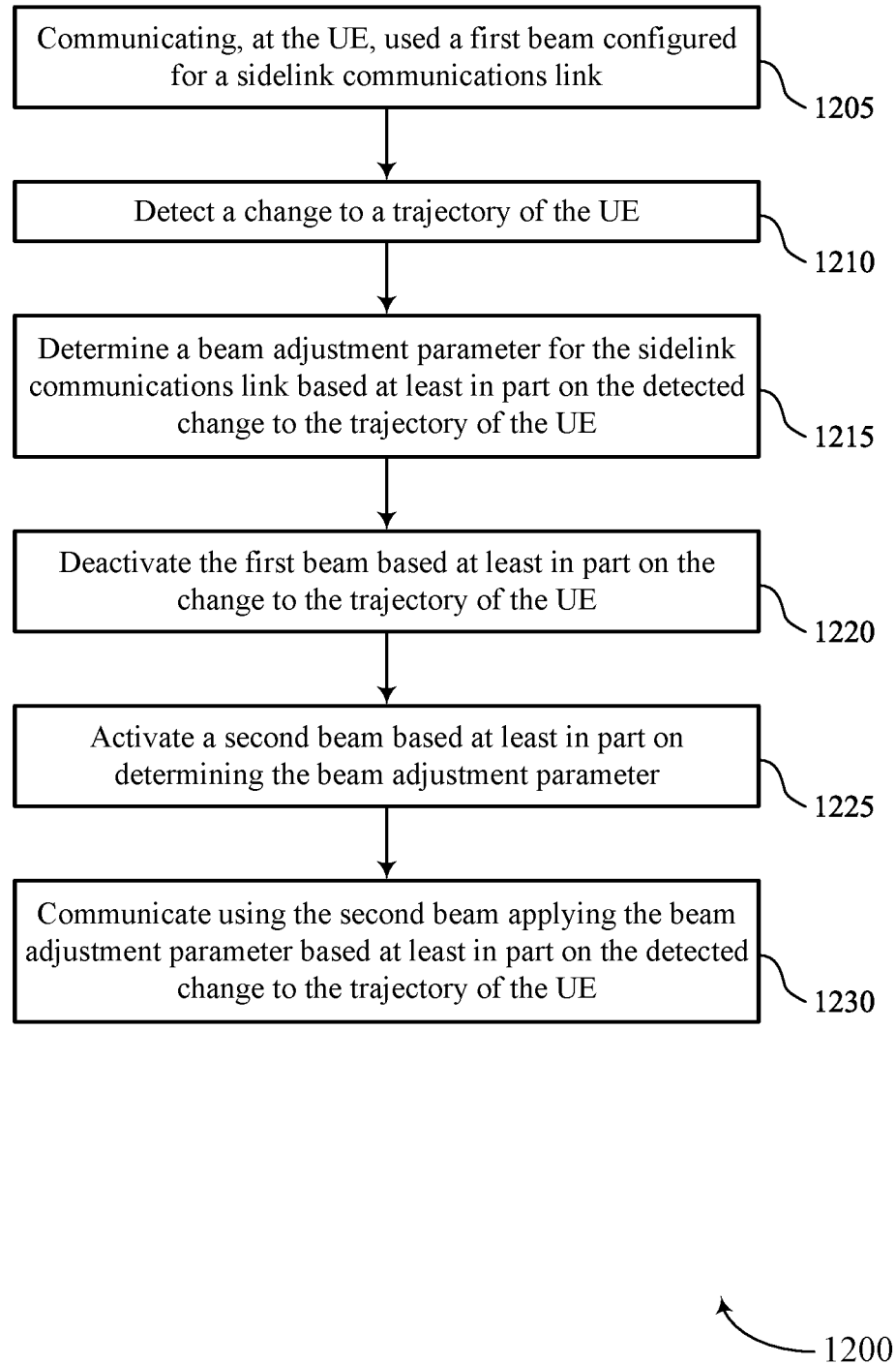

FIG. 12 shows a flowchart illustrating a method 1200 that supports techniques for beam refinement in vehicle to everything communications systems in accordance with aspects of the present disclosure. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1205, the method may include communicating, at the UE, using a first beam configured for a sidelink communications link. The operations of 1205 may be performed in accordance with examples as disclosed herein. In some examples, aspects of the operations of 1205 may be performed by a sidelink communications component 725 as described with reference to FIG. 7.

At 1210, the method may include detecting a change to a trajectory of the UE. The operations of 1210 may be performed in accordance with examples as disclosed herein. In some examples, aspects of the operations of 1210 may be performed by a change detection component 730 as described with reference to FIG. 7.

At 1215, the method may include determining a beam adjustment parameter for the sidelink communications link based on the detected change to the trajectory of the UE. The operations of 1215 may be performed in accordance with examples as disclosed herein. In some examples, aspects of the operations of 1215 may be performed by a beam adjustment component 735 as described with reference to FIG. 7.

At 1220, the method may include deactivating the first beam based on the change to the trajectory of the UE. The operations of 1220 may be performed in accordance with examples as disclosed herein. In some examples, aspects of the operations of 1220 may be performed by a beam adjustment component 735 as described with reference to FIG. 7.

At 1225, the method may include activating a second beam based on determining the beam adjustment parameter. The operations of 1225 may be performed in accordance with examples as disclosed herein. In some examples, aspects of the operations of 1225 may be performed by an adjusted beam communications component 740 as described with reference to FIG. 7.

At 1230, the method may include communicating using the second beam applying the beam adjustment parameter based on the detected change to the trajectory of the UE. The operations of 1230 may be performed in accordance with examples as disclosed herein. In some examples, aspects of the operations of 1230 may be performed by an adjusted beam communications component 740 as described with reference to FIG. 7.

The following provides an overview of aspects of the present disclosure:

Aspect 1: A method for wireless communications at a UE, comprising: communicating, at the UE, using a first beam configured for a sidelink communications link; detecting a change to a trajectory of the UE; determining a beam adjustment parameter for the sidelink communications link based at least in part on the detected change to the trajectory of the UE; and communicating using a second beam applying the beam adjustment parameter based at least in part on the detected change to the trajectory of the UE.

Aspect 2: The method of aspect 1, wherein detecting the change to the trajectory of the UE comprises: detecting the change to the trajectory of the UE based at least in part on a sensor of the UE or a computer vision application at the UE, or both.

Aspect 3: The method of any of aspects 1 through 2, wherein detecting the change to the trajectory of the UE comprises: receiving signaling indicating the change to the trajectory of the UE from another UE, a roadside unit, a server, a base station, or any combination thereof.

Aspect 4: The method of any of aspects 1 through 3, wherein determining the beam adjustment parameter comprises: determining a second beam width for the second beam based at least in part on the change to the trajectory of the UE, wherein the second beam width is wider than a first beam width for the first beam.

Aspect 5: The method of any of aspects 1 through 4, wherein determining the beam adjustment parameter comprises: determining a second beam direction for the second beam based at least in part on the change to the trajectory of the UE, wherein the second beam direction is different from a first beam direction for the first beam.

Aspect 6: The method of any of aspects 1 through 5, wherein communicating using the second beam comprises: deactivating the first beam based at least in part on the change to the trajectory of the UE; and activating the second beam based at least in part on determining the beam adjustment parameter.

Aspect 7: The method of any of aspects 1 through 6, wherein determining the beam adjustment parameter comprises: detecting the change to a gradient of a road, a banking angle of the road, a turning radius of the road, or a direction of the UE, or any combination thereof.

Aspect 8: The method of any of aspects 1 through 7, wherein determining the beam adjustment parameter comprises: determining the beam adjustment parameter prior to the change to the trajectory of the UE, wherein the second beam is used to communicate during the change to the trajectory of the UE.

Aspect 9: The method of any of aspects 1 through 8, further comprising: receiving signaling indicating the beam adjustment parameter from another UE, a roadside unit, a server, a base station, or any combination thereof.

Aspect 10: The method of any of aspects 1 through 9, further comprising: transmitting signaling indicating the change to the trajectory of the UE, the beam adjustment parameter, a location tag associated with the beam adjustment parameter, or any combination thereof, to another UE, a roadside unit, a server, a base station, or any combination thereof.

Aspect 11: The method of any of aspects 1 through 10, wherein communicating using the second beam comprises: maintaining a sidelink connection with another UE during the change to the trajectory of the UE.

Aspect 12: The method of any of aspects 1 through 11, wherein the sidelink communications link comprise vehicle-to-everything (V2X) communications.

Aspect 13: An apparatus for wireless communications at a UE, comprising a processor; memory coupled with the processor; and instructions stored in the memory and executable by the processor to cause the apparatus to perform a method of any of aspects 1 through 12.

Aspect 14: An apparatus for wireless communications at a UE, comprising at least one means for performing a method of any of aspects 1 through 12.

Aspect 15: A non-transitory computer-readable medium storing code for wireless communications at a UE, the code comprising instructions executable by a processor to perform a method of any of aspects 1 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:

communicating, at the UE, using a first beam configured for a sidelink communications link;

determining a predicted change to a trajectory of the UE based at least in part on a change to a gradient of a road, a banking angle of the road, a turning radius of the road, or a combination thereof;

storing, at a first time, environmental conditions of the UE based at least in part on determining the predicted change to the trajectory of the UE for use in proactive beam management on a route;

determining a beam adjustment parameter for the sidelink communications link based at least in part on the predicted change to the trajectory of the UE;

identifying, at a second time later than the first time, the environmental conditions of the UE based at least in part on storing the environmental conditions of the UE on the route;

applying the beam adjustment parameter based at least in part on identifying the environmental conditions of the UE; and communicating using a second beam applying the beam adjustment parameter based at least in part on the predicted change to the trajectory of the UE.

2. The method of claim 1, wherein determining the predicted change to the trajectory of the UE comprises:
determining the predicted change to the trajectory of the UE based at least in part on a sensor of the UE or a computer vision application at the UE, or both.

3. The method of claim 1, wherein determining the predicted change to the trajectory of the UE comprises:
receiving signaling indicating the predicted change to the trajectory of the UE from another UE, a roadside unit, a server, a network entity, or a combination thereof.

4. The method of claim 1, wherein determining the beam adjustment parameter comprises:
determining a second beam width for the second beam based at least in part on the predicted change to the trajectory of the UE, wherein the second beam width is wider than a first beam width for the first beam.

5. The method of claim 1, wherein determining the beam adjustment parameter comprises:
determining a second beam direction for the second beam based at least in part on the predicted change to the trajectory of the UE, wherein the second beam direction is different from a first beam direction for the first beam.

6. The method of claim 1, wherein communicating using the second beam comprises:
deactivating the first beam based at least in part on the predicted change to the trajectory of the UE; and
activating the second beam based at least in part on determining the beam adjustment parameter.

7. The method of claim 1, wherein determining the beam adjustment parameter comprises:
determining the beam adjustment parameter prior to an occurrence of a change to the trajectory of the UE, wherein the second beam is used to communicate during the change to the trajectory of the UE.

8. The method of claim 1, further comprising:
receiving signaling indicating the beam adjustment parameter from another UE, a roadside unit, a server, a network entity, or a combination thereof.

9. The method of claim 1, further comprising:
transmitting signaling indicating the predicted change to the trajectory of the UE, the beam adjustment parameter, a location tag associated with the beam adjustment parameter, or a combination thereof, to another UE, a roadside unit, a server, a network entity, or a combination thereof.

10. The method of claim 1, wherein communicating using the second beam comprises:
maintaining a sidelink connection with another UE during the predicted change to the trajectory of the UE.

11. The method of claim 1, wherein the sidelink communications link comprise vehicle-to-everything (V2X) communications.

12. An apparatus for wireless communications at a user equipment (UE), comprising:
a processor;
memory coupled with the processor; and
instructions stored in the memory and executable by the processor to cause the apparatus to:
communicate, at the UE, using a first beam configured for a sidelink communications link;
determine a predicted change to a trajectory of the UE based at least in part on a change to a gradient of a road, a banking angle of the road, a turning radius of the road, or a combination thereof;
store, at a first time, environmental conditions of the UE based at least in part on determining the predicted change to the trajectory of the UE for use in proactive beam management on a route;
determine a beam adjustment parameter for the sidelink communications link based at least in part on the predicted change to the trajectory of the UE;
identify, at a second time later than the first time, the environmental conditions of the UE based at least in part on storing the environmental conditions of the UE on the route;
apply the beam adjustment parameter based at least in part on identifying the environmental conditions of the UE; and
communicate using a second beam applying the beam adjustment parameter based at least in part on the predicted change to the trajectory of the UE.

13. The apparatus of claim 12, wherein the instructions to determine the predicted change to the trajectory of the UE are executable by the processor to cause the apparatus to:
determine the predicted change to the trajectory of the UE based at least in part on a sensor of the UE or a computer vision application at the UE, or both.

14. The apparatus of claim 12, wherein the instructions to determine the predicted change to the trajectory of the UE are executable by the processor to cause the apparatus to:
receive signaling indicating the predicted change to the trajectory of the UE from another UE, a roadside unit, a server, a network entity, or a combination thereof.

15. The apparatus of claim 12, wherein the instructions to determine the beam adjustment parameter are executable by the processor to cause the apparatus to:
determine a second beam width for the second beam based at least in part on the predicted change to the trajectory of the UE, wherein the second beam width is wider than a first beam width for the first beam.

16. The apparatus of claim 12, wherein the instructions to determine the beam adjustment parameter are executable by the processor to cause the apparatus to:
determine a second beam direction for the second beam based at least in part on the predicted change to the trajectory of the UE, wherein the second beam direction is different from a first beam direction for the first beam.

17. The apparatus of claim 12, wherein the instructions to communicate using the second beam are executable by the processor to cause the apparatus to:
deactivate the first beam based at least in part on the predicted change to the trajectory of the UE; and
activate the second beam based at least in part on determining the beam adjustment parameter.

18. The apparatus of claim 12, wherein the instructions to determine the beam adjustment parameter are executable by the processor to cause the apparatus to:
determine the beam adjustment parameter prior to an occurrence of a change to the trajectory of the UE, wherein the second beam is used to communicate during the change to the trajectory of the UE.

19. The apparatus of claim 12, wherein the instructions are further executable by the processor to cause the apparatus to:
receive signaling indicating the beam adjustment parameter from another UE, a roadside unit, a server, a network entity, or a combination thereof.

20. The apparatus of claim 12, wherein the instructions are further executable by the processor to cause the apparatus to:
transmit signaling indicating the predicted change to the trajectory of the UE to another UE, a roadside unit, a server, a network entity, or a combination thereof.

21. The apparatus of claim 12, wherein the instructions to communicate using the second beam are executable by the processor to cause the apparatus to:
maintain a sidelink connection with another UE during the predicted change to the trajectory of the UE.

22. The apparatus of claim 12, wherein the sidelink communications link comprise vehicle-to-everything (V2X) communications.

23. An apparatus for wireless communications at a user equipment (UE), comprising:
means for communicating, at the UE, using a first beam configured for a sidelink communications link;
means for determining a predicted change to a trajectory of the UE based at least in part on a change to a gradient of a road, a banking angle of the road, a turning radius of the road, or a combination thereof;
means for storing, at a first time, environmental conditions of the UE based at least in part on determining the predicted change to the trajectory of the UE for use in proactive beam management on a route;
means for determining a beam adjustment parameter for the sidelink communications link based at least in part on the predicted change to the trajectory of the UE;
means for identifying, at a second time later than the first time, the environmental conditions of the UE based at least in part on storing the environmental conditions of the UE on the route;
means for applying the beam adjustment parameter based at least in part on identifying the environmental conditions of the UE; and
means for communicating using a second beam applying the beam adjustment parameter based at least in part on the predicted change to the trajectory of the UE.

24. A non-transitory computer-readable medium storing code for wireless communications at a user equipment (UE), the code comprising instructions executable by a processor to:
communicate, at the UE, using a first beam configured for a sidelink communications link;

determine a predicted change to a trajectory of the UE based at least in part on a change to a gradient of a road, a banking angle of the road, a turning radius of the road, or a combination thereof;

store, at a first time, environmental conditions of the UE based at least in part on determining the predicted change to the trajectory of the UE for use in proactive beam management on a route;

determine a beam adjustment parameter for the sidelink communications link based at least in part on the predicted change to the trajectory of the UE;

identify, at a second time later than the first time, the environmental conditions of the UE based at least in part on storing the environmental conditions of the UE on the route;

apply the beam adjustment parameter based at least in part on identifying the environmental conditions of the UE; and communicate using a second beam applying the beam adjustment parameter based at least in part on the predicted change to the trajectory of the UE.

25. The non-transitory computer-readable medium of claim 24, wherein the instructions to determine the predicted change to the trajectory of the UE are executable by the processor to:
determine the predicted change to the trajectory of the UE based at least in part on a sensor of the UE or a computer vision application at the UE, or both.

26. The non-transitory computer-readable medium of claim 24, wherein the instructions to determine the predicted change to the trajectory of the UE are executable by the processor to:
receive signaling indicating the predicted change to the trajectory of the UE from another UE, a roadside unit, a server, a network entity, or a combination thereof.

27. The non-transitory computer-readable medium of claim 24, wherein the instructions to determine the beam adjustment parameter are executable by the processor to:
determine a second beam width for the second beam based at least in part on the predicted change to the trajectory of the UE, wherein the second beam width is wider than a first beam width for the first beam.

28. The non-transitory computer-readable medium of claim 24, wherein the instructions to determine the beam adjustment parameter are executable by the processor to:
determine a second beam direction for the second beam based at least in part on the predicted change to the trajectory of the UE, wherein the second beam direction is different from a first beam direction for the first beam.

* * * * *